United States Patent [19]

Calvert et al.

[11] Patent Number: 5,228,272
[45] Date of Patent: Jul. 20, 1993

[54] PRODUCT AND PROCESS FOR HEAT SEALING A PAPERBOARD CARTON HAVING POLYMER COATING ON ONE SIDE ONLY

[75] Inventors: Barry G. Calvert, Covington, Va.; Walter H. Donnellan, Jessup, Md.

[73] Assignee: Westvaco Corporation, New York, N.Y.

[21] Appl. No.: 6,940

[22] Filed: Jan. 21, 1993

Related U.S. Application Data

[62] Division of Ser. No. 907,112, Jul. 1, 1992, Pat. No. 5,217,159.

[51] Int. Cl.⁵ .......................... B31B 3/62; B31B 3/64
[52] U.S. Cl. ...................... 53/477; 493/130; 493/150; 493/332
[58] Field of Search .............. 53/477; 493/129, 130, 493/150, 151, 332

[56] References Cited

U.S. PATENT DOCUMENTS

| | | | |
|---|---|---|---|
| 4,249,978 | 2/1981 | Baker | 229/3.1 |
| 4,826,475 | 5/1989 | Eweryd | 493/10 |
| 4,930,639 | 6/1990 | Rigby | 206/621 |

Primary Examiner—William E. Terrell
Attorney, Agent, or Firm—W. A. Marcontell; R. L. Schmalz

[57] ABSTRACT

Folded paperboard food cartons having a polymer coating only on the interior surface and sales graphics on a substantially unplasticized clay coated exterior surface are heat sealed at contiguous areas of overlapping flaps wherein the polymer coated interior surface is in direct contact with a small portion of the clay coated exterior surface, or where it is desired to secure together two portions of the clay coated exterior surface. In such heat sealing areas, small and accurately located exterior clay coated carton surface areas are primed with a water based polymer emulsion such as ethylene vinyl acetate that is precisely applied to such areas by a printing press.

3 Claims, 3 Drawing Sheets

PRODUCT AND PROCESS FOR HEAT SEALING A PAPERBOARD CARTON HAVING POLYMER COATING ON ONE SIDE ONLY

This is a division of application Ser. No. 07/907,112, filed Jul. 1, 1992, U.S. Pat. No. 5,217,159.

BACKGROUND OF THE INVENTION

1. Field of the Invention:

The present invention relates to paperboard food packages. More particularly, the invention relates to a process for heat sealing paperboard food packages and the packages produced by the process.

2. Description of the Prior Art:

One or two serving portions of precooked and/or frozen food are frequently packaged for consumer distribution in paperboard trays. Such trays are folded form preprinted and die-cut bleached sulphate paperboard.

Covers for these paperboard trays may take one of several forms including a top flap that is an integral continuation of the same paperboard sheet from which the tray is erected, such top flap being creased hinged to one sidewall of the tray. Another type of lid has been an independent paperboard sheet that is adhesively secured or plastic fuse bonded to a small perimeter flange folded from the upper edge of the tray sidewalls.

To protect the food contacting internal surfaces of the paperboard tray structure from moisture penetration, the internal surfaces are coated with one or more continuous films of extruded thermoplastic. This internal moisture barrier is applied as a free-flowing curtain to the paperboard while still in the continuous web form: prior to printing and cutting. Polyethylene (LDPE), polypropylene (PP) and polyethylene terephthalate (PET) are merely three of the more popular thermoplastic polymers used for this purpose.

For the purpose of tray structure protection, the single internal polymer coating is sufficient. However, if a paperboard tray closure is required, it may be necessary to coat the tray and cover with an external coating of thermoplastic for the primary function of heat sealing the tray cover to the tray sides or flanges. This necessity arises from the material construction of bleached sulphate paperboard.

As with all other foudrinier laid paper webs, bleached paperboard is produced with a "top side" and a "wire side". For food packaging, the top side is preferred for the thermoplastic food moisture barrier. The wire side is given a clay coating that is smoothed by calendering to provide a superior print surface. This clay coated paperboard surface is a poor receptor of polymer coatings, however. Consequently, it is difficult to secure a reliable heat seal between the interior thermoplastic surface of a paperboard tray against a "naked" clay coated exterior surface.

A specific example arises with respect to a tray having an integrally hinged cover with flap extensions from the cover plane for overlapping three tray sidewalls. The tray contents are tightly enclosed by bonding the cover clap extensions against the three tray sidewalls. Production line pace permits less than 1 second to secure the flap-to-wall bond. The present invention focuses upon the mechanics of this bond.

As previously inferred, the predominately practiced prior art merely avoids the polymer-to-naked clay surface bonding problem by curtain coating the entire clay-coated wire side of the paperboard web with an extruded film of extremely hot, viscously flowing polymer: in the same manner as the food moisture barrier is applied to the paperboard web top side. Frequently, the naked clay surface of the wire side is pretreated by open flame or corona discharge immediately prior to hot polymer contact to enhance deep bonding of the polymer with the topically applied clay and underlying paper fiber. By this expedient, the underside surface of a tray cover flap and the exterior surface of the tray sidewall are coated with the same or at least compatible polymers and are easily fuse bonded at low track temperature and joint compression pressure.

However, polymer coating an entire exterior package surface for the singular reason of effecting a reliable, rapid and low pressure heat seal with the top closure tabs produces several collateral consequences that must be accommodated. The first, obvious, consequence is economic. Proportionately, the exterior polymer coat adds significantly to the total package cost. Moreover, only a small portion of the full surface coating is actually functional for the purpose applied. A second, adverse consequence of an exterior polymer coating is the necessity for using specialized, volatile inks for the colorful sales and informational graphics applied to the exterior surfaces of these packages. Use of these inks creates additional economic, safety and environmental concerns. The exterior polymer coat is softer than the naked clay coat and therefore mars and scratches more easily. Finally, the additional polymer coating further complicates repulping and recycling the fiber composition of the package.

As additional factors to the present invention prior art and development, it should be understood that a typical commercial food tray filling line advances at the rate of 60 to 120 units per minute. Consequently, any step or process in the continuous production line that requires a full stop of the subject unit must be accomplished in one second or less. Other processing steps are performed on a moving unit. Moreover, once the tray is filled with food product and the cover positioned, the tray inside surfaces are inaccessible for nip pressure backing. Any force applied to a cover flap for sealing against a tray side wall must be less than the crushing capacity of the erected tray. Frequently, only a gentle touch is permissible.

In addition to the previously described expedient of heat fusing polymer curtain coatings applied to both paperboard surfaces, the prior art has also relied upon both cold set and hot set adhesives to achieve a better lid-to-tray seal. Each of these adhesive sealing devices carry respective adverse consequences, however. Cold set adhesives are extremely slow setting and therefore incompatible with a production of 120 units per minute. Hot melt adhesives have relatively low softening temperatures which are compatible with typical oven temperatures used when the food within the package is heated for consumption.

It is an object of the present invention to provide a process for sealing paperboard food packages having a polymer barrier coating applied only to the inside package surface.

Another object of the present invention is to provide paperboard food packages having only an interior surface coating of polymer for food moisture containment that is quickly and easily heat sealed to an opposite side having graphics applied to a naked clay and/or paperboard surface.

Another object of the present invention is to provide a precisely positioned spot area of polymer primer to a paperboard surface that is otherwise devoid of a plastic coating whereby a polymer coated paperboard surface may be easily heat fused thereto.

Another object of the present invention is to provide relatively small, precisely positioned, cooperative areas of polymer primer to a paperboard surface that is otherwise devoid of plastic coating whereby predetermined portions of such unplasticized paperboard surface may be quickly heat fused together.

SUMMARY OF THE INVENTION

These and other objects of the invention as will become apparent from the following description, are provided by a waterborne polymer emulsion that may be precisely applied, topically and cold, as by means of a printing press, to sharply delineated areas of the clay coated paperboard surface of a continuously running web of printed package blanks. The areas of such polymer emulsion application are determined by the overlay of a continuous food moisture barrier surface on the opposite side of the printed web. Following filling, selected heat-seal areas intended to secure and seal the package enclosure, are simultaneously heated by forced hot air. Rendered tacks, the two polymer covered paperboard areas are pushed together and chilled while in contact.

BRIEF DESCRIPTION OF THE DRAWINGS

Relative to the drawings wherein line reference characters designate like or similar characters throughout the several figures of the drawings.

DESCRIPTION OF THE PREFERRED EMBODIMENTS

Figure 1:
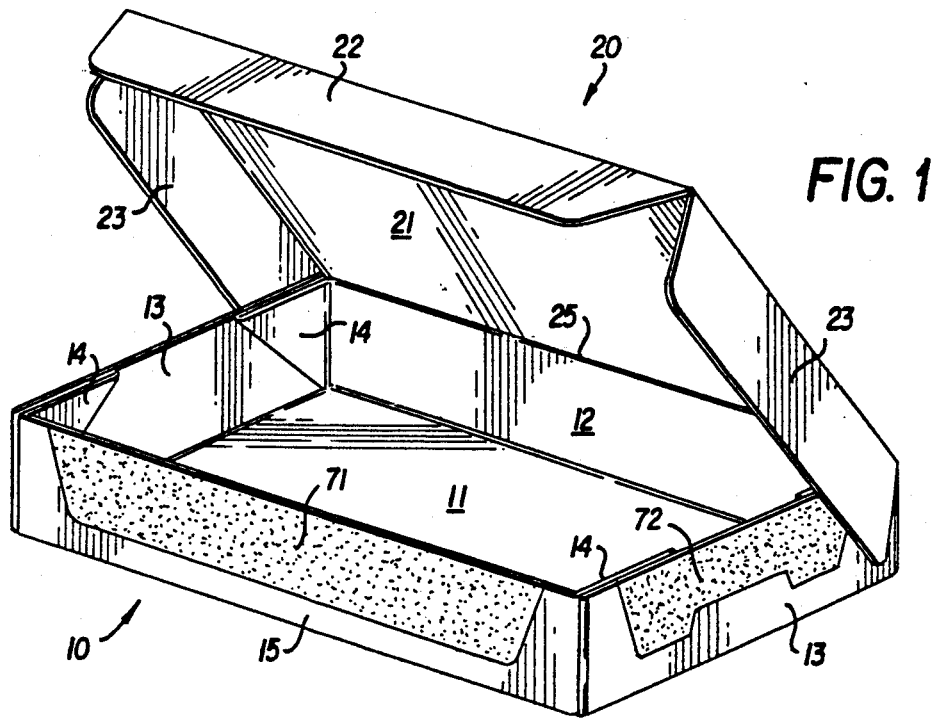
FIG. 1 is a perspective view of a first package embodiment of the invention.
Figure 2:
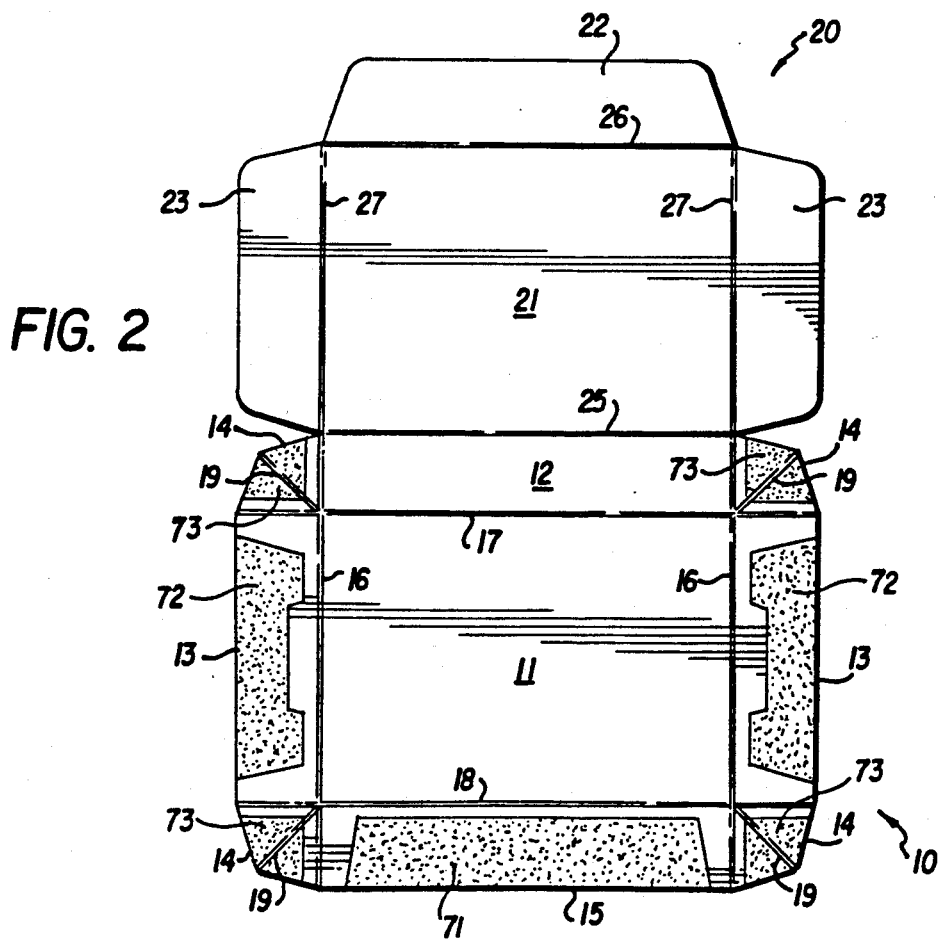
FIG. 2 is an exterior surface plan view of a cut, scored and printed blank for fabricating the FIG. 1 package.

The pictorial illustration of FIG. 1 represents an erected paperboard carton which embodies the present invention principles. FIG. 2 illustrates a flat sheet paperboard blank, cut, scored and printed to be erected to the FIG. 1 form and configuration.

With respect to FIGS. 1 and 2, the carton broadly comprises a tray 10 and a closure 20. The tray components include the bottom panel 11, end walls 13, back wall 12, front wall 15 and corner gussets 14. The closure components include the top panel 21, side flap 22 and end flaps 23. Score line 25 between the top panel 21 and back wall 12 functions as an integral hinge for closure 20.

The paperboard substrate for the present invention is typically a 0.018 inch thick bleached sulphate sheet. Definitively, the term paperboard describes paper within the thickness range of 0.008 to 0.028 inches. The invention is relevant to the full scope of such range as applied to packaging and beyond.

One face or side of the paperboard sheet, usually the wire side, receives a fluidized mixture of finely particulated mineral and starch as a smoothly screeded coating. Minerals such as clay and calcium carbonate are most frequently used. Successive densification and polishing by calendering finishes the mineral coated surface to a high degree of smoothness and a superior graphics print surface. This clay coated surface is prepared to become the exterior surface of a present invention food package.

The other face or side of the paperboard sheet is coated with a curtain applied film of polymer for the purposes of a protective barrier and moisture confinement. Typically, the polymer is polyethylene, polypropylene or polyethylene terethylate heated to a viscous flow temperature and extruded as a curtain onto the traveling surface of the web. Ten to eleven pounds of polymer per ream (3000 ft.$^2$) of paperboard surface is an adequate application rate for most purposes but rates of five to twenty pounds per ream have been used.

As previously explained, one of the commercially valuable characteristics of paperboard as a food packaging material is the superior print surface provided by the calendered mineral coating. However, a surface coat of polymer applied as a hot curtain to the inner side of the food package will not reliably heat bond to the unprimed and unplasticized exterior surface. The terms "heat bonding," "fuse bonding" or "heat sealing" are used interchangeably to describe the process of heating a thermoplastic polymer to a tacky state for the purpose of structurally bonding to another surface. The traditional prior art practice requires both surfaces to be joined to have hot curtain applied polymer coatings, both of which are heated to a tacky temperature for joining.

The present invention anticipates a package construction similar to that of FIG. 1 wherein the closure top panel 21 is secured against the exposed edges of erected sides 13 and 15 by heat sealing the inside surfaces of top flaps 22 and 23 to the outside surfaces of contiguous sides 12 and 13. The inside face of top flaps 22 and 23 are coated with a hot curtain applied polymer. However, the outside face of tray sides 13 and 15 are not hot coated.

In lieu of a hot curtain coat of polymer applied uniformly over the clay coated surface, the present invention provides precisely delineated, press applied areas of water based polymer emulsion to those exterior tray sides that are lapped by the top flaps 22 and 23 as represented by the cross-hatched 71 and 72 areas of tray sides 13 and 15.

Adcote 37R972HV, 37T77 and X19-7 produced by Morton International, Inc. of 1275 Lake Avenue, Woodstock, Ill., 60098 are proprietary emulsions having the desirable properties and characteristics. The polymer constituent in such emulsions is solubilized by acidic modification and then buffered to a pH when the acid exists as a salt. The tack temperature is about 375° F. and the application rate may range from 0.5 lb/ream to 4.0 lbs/ream although most applications will find an application rate of 2 to 3 lbs/ream optimum. The working viscosity of such emulsions is reduced by water solvation.

In the normal course of events, printed, cut and scored package blanks as depicted by FIG. 2 are delivered in an open or flat configuration. Either on or off the product filling line, the tray 10 is erected by folding the tray bottom walls 12, 13 and 15 about respective score lines 17, 16 and 18 to a position 90° of the bottom panel 11. Similarly, top flaps 22 and 23 are folded 90° to the top panel 21 about respective score lines 26 and 27. The folds described are merely break-overs; meaning that due to the high degree of paperboard stiffness and memory, the 90° fold position will not be retained without additional means of positional security. Gussets 14 provide such security to the tray walls.

As the printed emulsion applied to the cross-hatched gusset areas 73 is heated to the tack temperature, the gusset panels are folded about gusset scores 19 and the integral tray walls 12, 13 and 15 are turned to the erect position. These dynamics bring the gusset half portions on opposite sides of a respective gusset score 19 into face-to-face opposition and contact. At tack temperature, the emulsion fuses. Subsequent chilling secures the folded gusset position and hence, the erect positions of the tray walls.

Although secured, the folded gusset 14 projects a triangular fin into the tray vessel space. This disadvantage is dispatched as shown by FIG. 1 by heating one side of each triangular gusset fin and a portion of an adjacent wall. In this configuration, it will be recalled that the entire inside surface of the package blank was curtain coated with polymer. This inside polymer coating covers both triangular sides of the gusset and respective tray walls. Selective heating and pressure will secure the gusset fin to the inside plane of a respective side wall 13.

To be further noted from the geometry of gusset 14, no cut edge is presented to the internal vessel volume formed within the tray walls. All surfaces within that vessel volume have been coated by the moisture barrier polymer.

Figure 3:
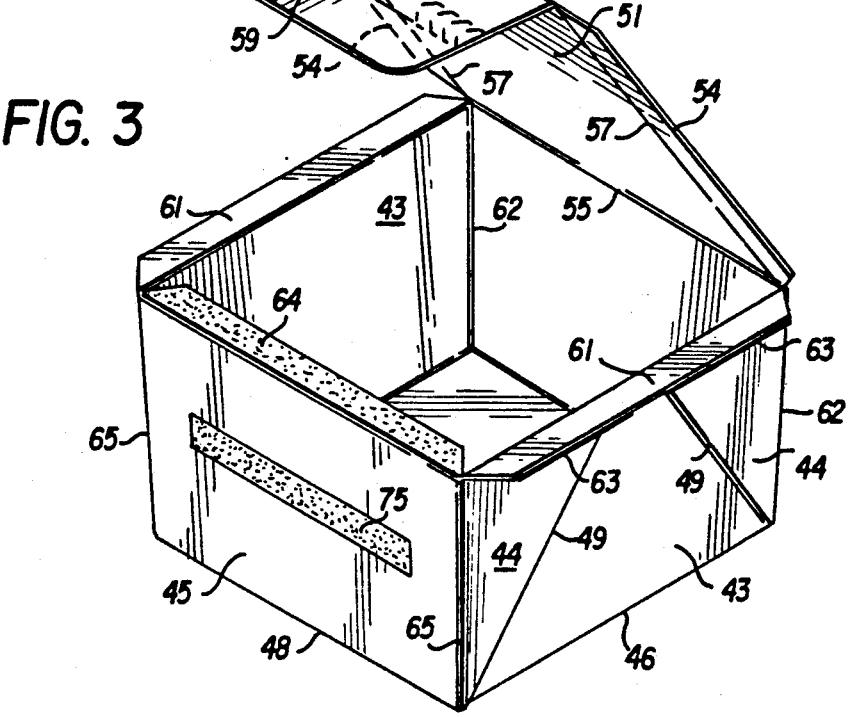
FIG. 3 is a perspective view of a second package embodiment of the invention.
Figure 4:
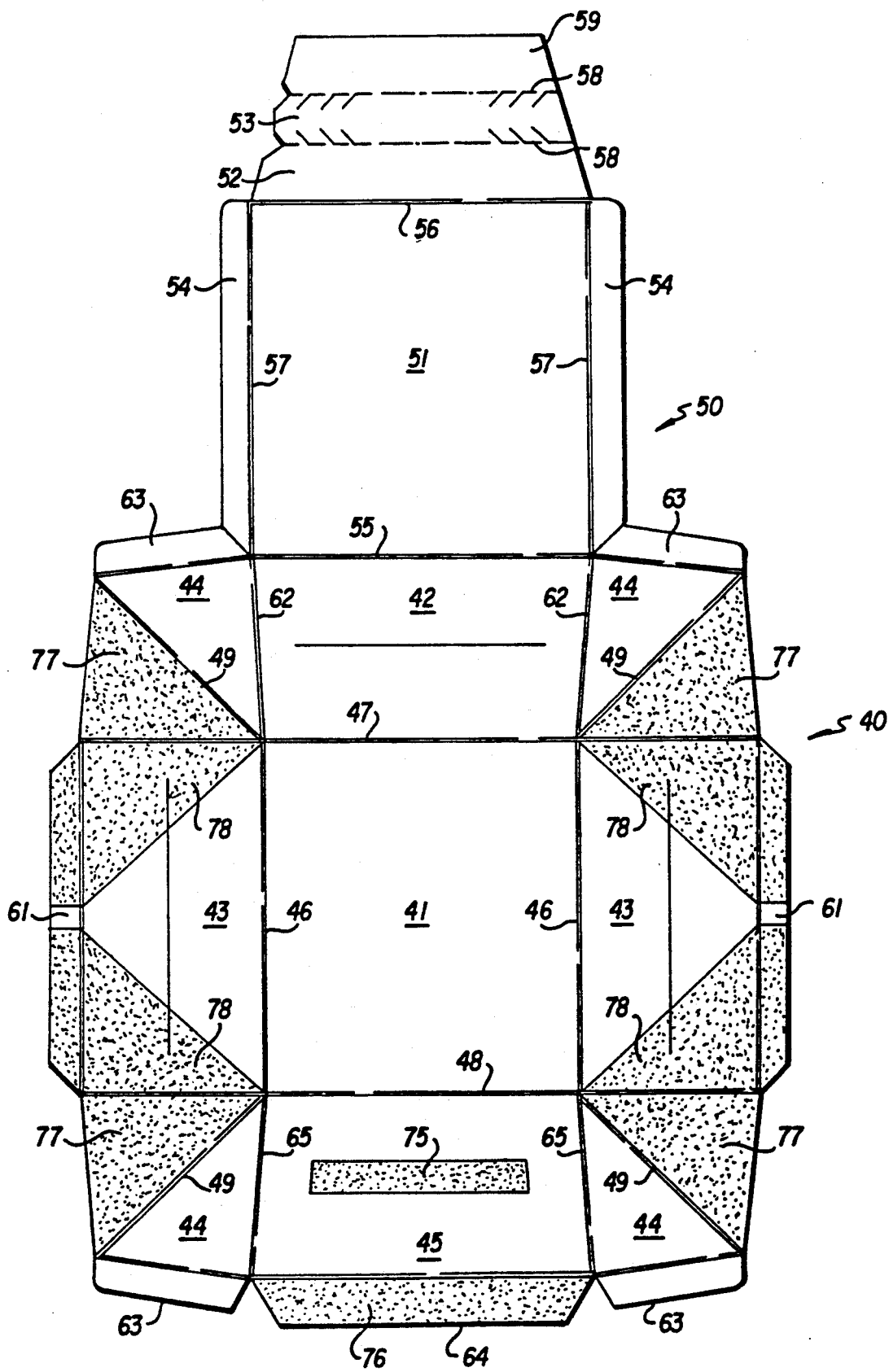
FIG. 4 is an exterior surface plan view of a cut, scored and printed blank for fabricating the FIG. 3 package.

FIGS. 3 and 4 represent a second embodiment of the invention having a deeper vessel portion 40 closed by a cover portion 50. Bottom edge score line 47 joins back wall 42 to the bottom panel 41, score lines 46 join the side walls 43 to the bottom panel 41 and score line 48 joins the front wall 45 to the bottom panel 41. Score line 55 hinges the top panel 51 to the back wall 42. Score line 56 hinges the top panel 51 to the front closure flap 52 and score lines 57 hinge the top panel 51 to the side closure tabs 54. A rip strip 53 between parallel rows of perforation lines 58 facilitates opening of the sealed package by providing lines of strip tear weakness between the end portion 59 of the front closure flap 52 and, the top panel 51. When closed, such end portion 59 is fuse bonded to the front wall 45 at the printed emulsion strip 75. Additional sealing may be provided by a printed emulsion coating 76 on the front wall tab 64 which is heat fused to the curtain applied polymer coat on the underside of top panel 51.

In this FIG. 3 and 4 embodiment, the fins formed by folding gussets 44 about the score line 59 are projected to the outer perimeter of the erected package and secured to the outer face of side walls 43. Polymer emulsion areas 77, printed on the outer clay surface of the paperboard blank, permit that face of the triangular fin to the heat fused to the printed emulsion areas 78 along the side walls 43. The inside surfaces of gusset tabs 63 are heat fused to outside surfaces of side wall tabs 61 for assembled rigidity.

Completion of the package seal includes a heat fusion between the inside polymer coat surfaces respective to the side wall tabs 61 and the top closure tabs 54.

Tray erection is normally accomplished by progressive roll forming of the paperboard blank over a traveling mandrel. At this point in the process, both sides of the blank, inside and outside, are accessible to forming structure. After the tray is erected and filled with product, however, tooling structure can no longer be placed against the inside wall surfaces. For example, sealing the closure flaps 22 and 23 to the exterior surfaces of the tray walls 13 and 15 must be accomplished with no more sealing pressure than is permitted by the free standing paperboard material.

Figure 5:
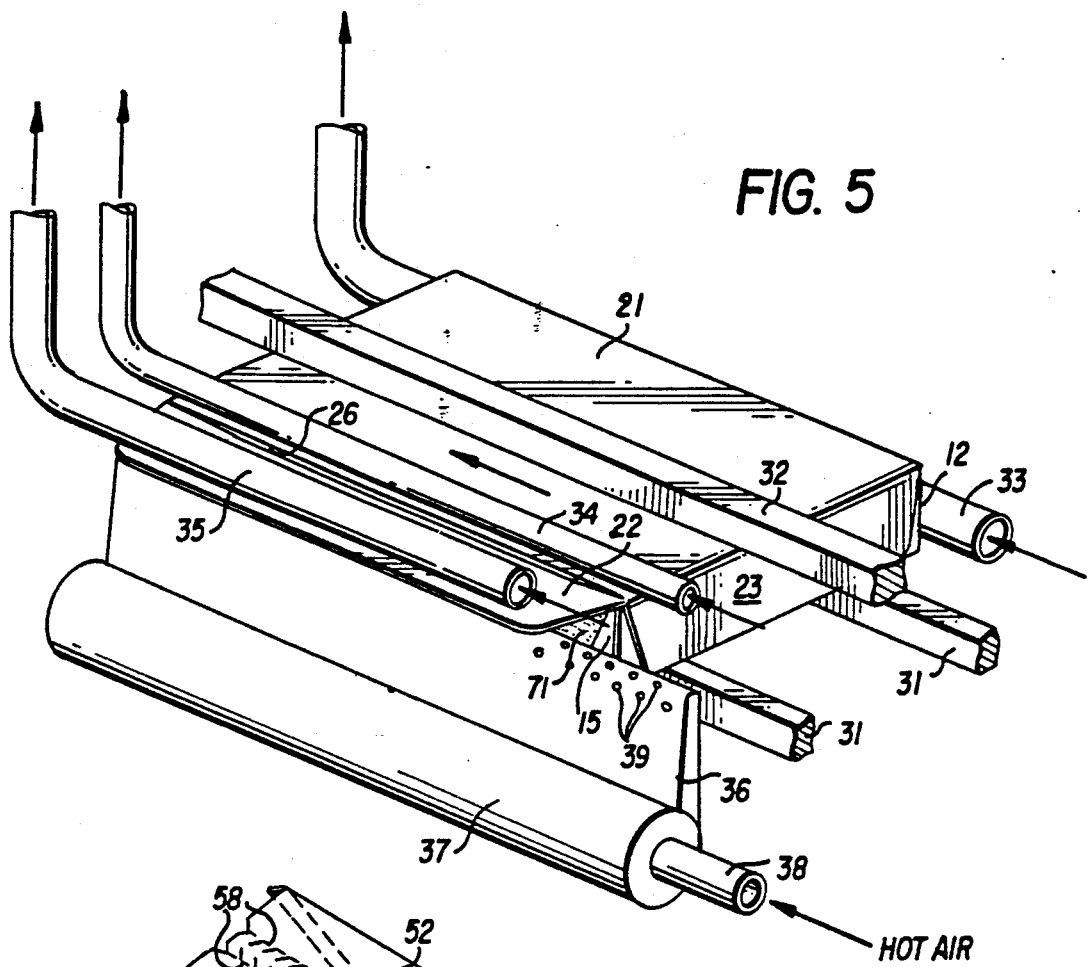
FIG. 5 is a typical heating apparatus for preparing a present invention package to be sealed at the end of a filling line.

Production systems to accomplish the flap closure seals include structure such as represented by FIG. 5 which includes a pair of carrier rails 31. A traveling series of trays are supported by the carrier rails 31 and vertically confined by a top rail 32.

Laterally, the line of moving trays is confined by a back bar 33 which is a fluid conduit for heat control. Similarly, liquid cooled guide pipe 34 holds the tray closure panel 21 down against the upper edge of the tray front wall 15 while liquid cooled guide pipe 35 confines the angle of rotation that flap 22 is allowed about score line 26.

Within the angular space between the underside of flap 22, which has a certain applied polymer barrier film, and the exterior face of the tray front wall 15, which has a printing press applied polymer emulsion, is an elongated hot air nozzle 36. A hot air carrier conduit 38 guides 800° F. to 1100° F. air or gas from a source into a distribution manifold 37 and the nozzle 36. Nozzle orifices 39 direct the hot air against the opposing polymer surfaces respective to the flap 22 and the wall 15. In the brief, half second the tray surfaces are proximate of the nozzle 36 discharge, the opposing polymer surfaces are sufficiently heated to become tacky.

Immediately following passage of a tray past the heating nozzle 36, a shoe structure, not shown, presses front flap 22 against the wall 15 to fuse the curtain applied barrier coating on the flap 22 with the press applied emulsion on wall 15.

At other, heating and pressing stations along the sealing line, end flaps 23 are fused to the tray end walls 13 in the same manner as described from FIG. 3.

Having fully described our invention, those of ordinary skill in the art may adapt obvious modifications. As our invention, however: we claim:

1. A method of fabricating a paperboard enclosure comprising the steps of:

forming a paperboard web having a substantially continuous, hot, viscous curtain of polymer applied exclusively to one side thereof;

by means of printing apparatus, applying a solution of water based, polymer emulsion to relatively small, predetermined areas of the other side of said paperboard web;

cutting an enclosure blank from said web having an inside surface corresponding to said one web side and an outside surface corresponding to said other web side;

forming an enclosure configuration from said blank with paired closure portions having lapped, mutually facing surfaces, one of said mutually facing surfaces being an inside surface and the other facing surface being a predetermined area of polymer emulsion whereby said mutually facing surfaces are bonded together as a consequence of mutual heating and contacting.

2. A method as described by claim 1 wherein said enclosure configuration is erected by fuse bonding adjacent polymer emulsion coated areas of corner gussets, said corner gussets being secured substantially flat against respective enclosure walls by fuse bonds between respective areas of said inside surface.

3. A method as described in claim 1 wherein said enclosure configuration is erected by fuse bonding adjacent inside surface areas of corner gussets, said gussets being secured substantially flat against respective enclosure walls by fuse bonds between respective polymer emulsion coated areas.

* * * * *

UNITED STATES PATENT OFFICE
CERTIFICATE OF CORRECTION

PATENT NO. : 5,228,272
DATED : Jul. 20, 1993
INVENTOR(S) : Barry G. Calvert and Walter H. Donnellan It is certified that error appears in the above-identified patent and that said Letters Patent is hereby corrected as shown below:

Column 2, line 56, "compatible" should be --incompatible--.
Column 3, line 26, "tacks" should be --tacky--; line 31, change "line" to --like--.

Signed and Sealed this

Eighth Day of February, 1994

Attest:

BRUCE LEHMAN

Attesting Officer

Commissioner of Patents and Trademarks